US012523368B2

(12) United States Patent
Pitonzo et al.

(10) Patent No.: US 12,523,368 B2
(45) Date of Patent: Jan. 13, 2026

(54) LIGHT FIXTURE FOR A DOOR FRAME

(71) Applicant: Endura Products, LLC, Colfax, NC (US)

(72) Inventors: Michael Pitonzo, Colfax, NC (US); Cody McMillian, Colfax, NC (US); Tomasz Jaskiewicz, Oak Ridge, NC (US)

(73) Assignee: Endura Products, LLC, Colfax, NC (US)

( * ) Notice: Subject to any disclaimer, the term of this patent is extended or adjusted under 35 U.S.C. 154(b) by 0 days.

(21) Appl. No.: 18/895,631

(22) Filed: Sep. 25, 2024

(65) Prior Publication Data

US 2025/0102138 A1 Mar. 27, 2025

Related U.S. Application Data

(60) Provisional application No. 63/554,441, filed on Feb. 16, 2024, provisional application No. 63/540,186, filed on Sep. 25, 2023.

(51) Int. Cl.

| | |
|---|---|
| ***F21V 33/00*** | (2006.01) |
| ***E06B 7/28*** | (2006.01) |
| ***F21S 9/02*** | (2006.01) |
| ***F21V 23/04*** | (2006.01) |

(52) U.S. Cl.

CPC .............. *F21V 33/006* (2013.01); *E06B 7/28* (2013.01); *F21S 9/02* (2013.01); *F21V 23/0464* (2013.01); *F21V 23/0471* (2013.01)

(58) Field of Classification Search

CPC .......... E06B 7/00; E06B 7/08; F21V 23/0471; F21V 33/006; F21S 9/02

See application file for complete search history.

(56) References Cited

U.S. PATENT DOCUMENTS

| | | | | |
|---|---|---|---|---|
| 9,870,758 B2 | 1/2018 | Finch et al. | | |
| 10,927,591 B1 * | 2/2021 | Brychell | ............... | F21V 33/006 |
| 11,655,669 B2 | 5/2023 | Hutton et al. | | |

(Continued)

FOREIGN PATENT DOCUMENTS

| | | | | |
|---|---|---|---|---|
| CA | 3210095 A1 * | 8/2022 | ......... | E05D 11/0081 |
| CN | 209083155 U | 7/2019 | | |

OTHER PUBLICATIONS

Innovation Q+ NPL Search (Year: 2024).*
CA-3210095-A1 English machine translation (Year: 2022).*

*Primary Examiner* — Anabel Ton

(74) *Attorney, Agent, or Firm* — Ice Miller, LLP; Richard L. Cruz

(57) ABSTRACT

A door assembly includes a door frame defining a doorway, a door, and a light fixture. The door frame includes a first jamb, a second jamb, and a header extending between the first jamb and the second jamb. The door has an interior face and an exterior face opposite the interior face. The door is pivotally secured to the door frame. The door has a closed position in which the door fills the doorway and an open position in which the passage through the doorway is allowed. The light fixture is disposed within the header on an exterior side of the door. The fixture is switchable between an on-state in which the light fixture illuminates the doorway and an off-state in response to input from a sensor. The sensor disposed within the light fixture and capable of sensing a change in environmental conditions.

21 Claims, 8 Drawing Sheets

(56) References Cited

U.S. PATENT DOCUMENTS

| | | | |
|---|---|---|---|
| 2016/0353542 | A1 | 12/2016 | Orr |
| 2016/0358437 | A1 | 12/2016 | Johnson et al. |
| 2020/0040649 | A1 | 2/2020 | Harvey et al. |
| 2020/0347643 | A1 | 11/2020 | Burke et al. |
| 2021/0207421 | A1 | 7/2021 | Sorice et al. |
| 2022/0412156 | A1 | 12/2022 | Macdonald et al. |
| 2023/0010220 | A1 | 1/2023 | Nitidharmatut |

* cited by examiner

LIGHT FIXTURE FOR A DOOR FRAME

CROSS-REFERENCE TO RELATED APPLICATION

This application claims priority to, and the benefit of, U.S. Provisional Patent Application No. 63/540,186, filed Sep. 25, 2023, and U.S. Provisional Application No. 63/554,441, filed Feb. 16, 2024, the entire contents of which are hereby incorporated by reference.

BACKGROUND

1. Technical Field

The present disclosure relates to door frames and, more specifically, to light fixtures for a door frames.

2. Discussion of Related Art

Door assemblies have been provided with electronic features to provide additional security and convenience. Electronic entry features may include electronic door locks (e.g., push button, biometric sensor, RFID reader), intercoms, cameras, and motion sensors. Inclusion of these electronic features may, for example, provide for remote communication with a user (e.g., homeowner, business owner, resident, or employee) through wireless communication (e.g., Wi-Fi or cellular) with the user's cell phone, tablet, or computer.

SUMMARY

This disclosure relates generally to light fixtures for door frame members.

In an aspect of the present disclosure, a door assembly includes a door frame defining a doorway, a door, and light fixture. The door frame includes a first jamb, a second jamb, and a header extending between the first jamb and the second jamb. The door has an interior face and an exterior face opposite the interior face. The door is pivotally secured to the door frame. The door has a closed position in which the door fills the doorway and an open position in which the passage through the doorway is allowed. The light fixture is disposed within the header on an exterior side of the door. The fixture is switchable between an on-state in which the light fixture illuminates the doorway and an off-state in response to input from a sensor. The sensor disposed within the light fixture and capable of sensing a change in environmental conditions.

In aspects, the sensor is disposed within the light fixture at a first end segment of the light fixture. The light fixture may have another sensor disposed within the light fixture at a second end segment opposite the first end segment of the light fixture. The light fixture may include a light element. The first end segment and the second end segment may be separated by the light element.

In some aspects, the header has a bottom surface and the light fixture has an outer surface. The light fixture may be disposed within the header such that the outer surface is substantially flush with the bottom surface.

In certain aspects, the sensor is a motion sensor configured to switch the light fixture from the off-state to the on-state in response to motion on the exterior side of the door. The sensor may be a light level sensor configured to switch the light fixture from the off-state to the on-state in response to ambient light levels being below a threshold level and to switch the light fixture from the on-state to the off-state in response to ambient light levels being above a threshold level. The light fixture may span substantially the entire width of the header. The header may include a battery in electrical communication with the light fixture.

In another aspect of the present disclosure, a door frame assembly has an interior side and an exterior side. The door assembly includes a first jamb, a second jamb, a header, and a light fixture. The light fixture is disposed within the header between the interior side and the exterior side of the door frame assembly. The light fixture is configured to switch between an on-state and an off-state in response to environmental conditions.

In particular aspects, the light fixture is configured to switch from the off-state to the on-state in response to ambient light levels below a threshold level and to switch from the on-state to the off-state in response to ambient light levels above a threshold level.

In another aspect of the present disclosure, a light fixture includes a case, a light element, a first sensor, and a second sensor. The case defines a plurality of ports. The light element is disposed within the case. The light element has an on-state in which the light element is configured to illuminate a doorway defined by the door frame and an off-state. The first sensor is disposed through one port of the plurality of ports. The second sensor is disposed through another port of the plurality of port. The first sensor or the second sensor is in signal communication with the light element to switch the light element between the on-state and the off-state in response to environmental conditions.

In another aspect of the present disclosure, a door assembly includes a door frame and a light fixture. The door frame defines a doorway. The door frame has a first jamb, a second jamb opposing the first jamb, and a header extending between the first jamb and the second jamb. The light fixture is disposed within the header. The light fixture includes a light element, a first sensor, and second sensor. The light element has an on-state in which the light element is configured to illuminate the doorway and an off-state. The first sensor or the second sensor is in signal communication with the light element to switch the light element between the on-state and the off-state in response to environmental conditions. The light fixture is configured to such that the light element, the first, sensor, or the second sensor are serviceable while the light fixture is within the header.

In another aspect of the present disclosure, a door assembly as shown and described herein.

In another aspect of the present disclosure, a member for a door assembly as shown and described herein.

In another aspect of the present disclosure, a method of manufacturing a door assembly as shown and described herein.

In another aspect of the present disclosure, a method of operating a door frame assembly as shown and described herein.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
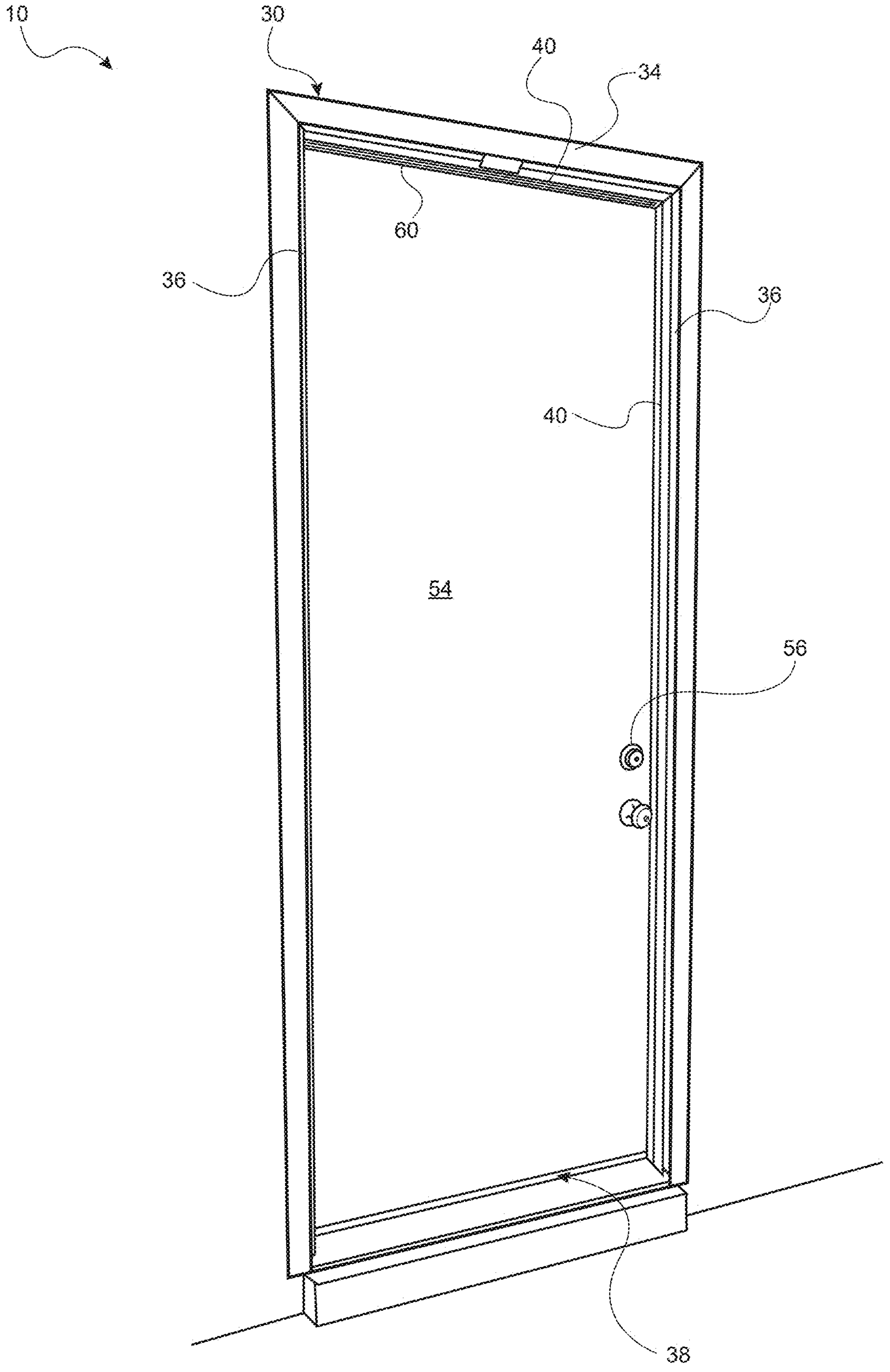
FIG. 1 is a front, perspective view of a door assembly having a door frame in accordance with embodiments of the present disclosure with a door in a closed position thereof.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 2:
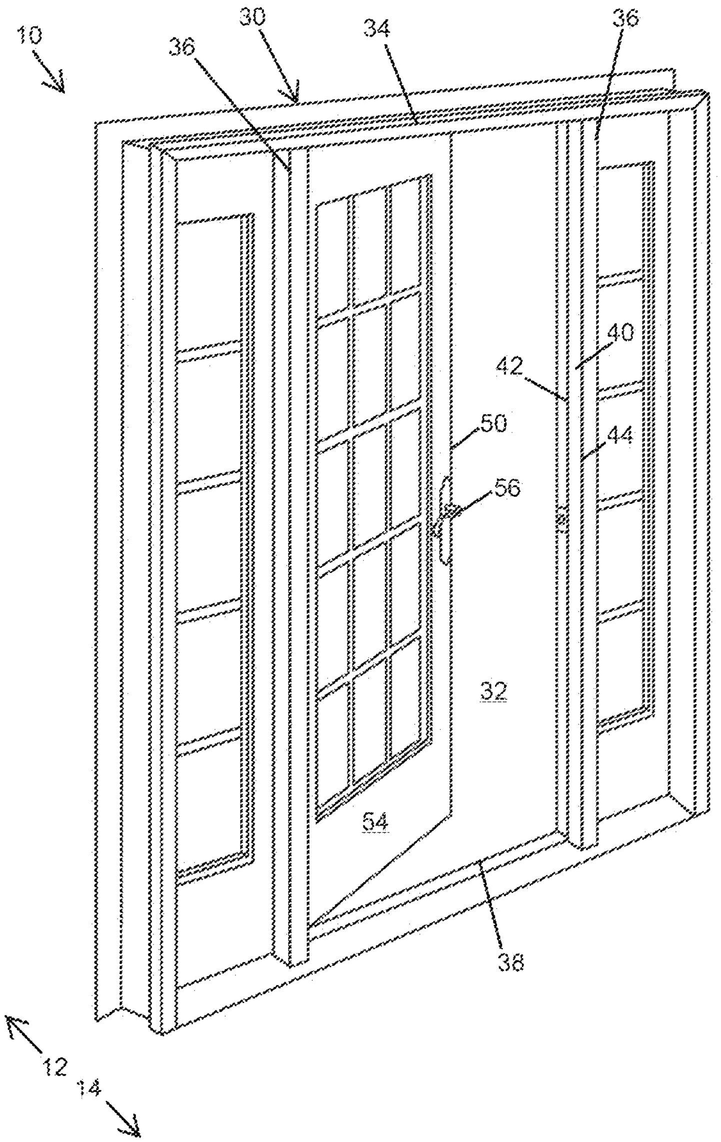
FIG. 2 is a front, perspective view the door assembly of FIG. 1 with the door in an open position thereof.

Referring now to FIGS. 1 and 2, a door assembly 10 having a door frame 30 is described in accordance with embodiments of the present disclosure. The door frame 30 defines a doorway 32 that allows passage through the door frame 30. In some embodiments, the door frame 30 defines the doorway 32 between an interior and an exterior of a structure to allow ingress into or egress from the structure through the doorway 32. A door 50 secures to the door frame 30 and moves between an open position (FIG. 2) and a closed position (FIG. 1). When the door 50 is in the open position passage through the door frame 30 is allowed. When the door 50 is in the closed position the door 50 fills the doorway 32 and restricts passage through the door frame 30. The door frame 30 has a first side 12 and a second side 14 that may be an interior side and an exterior side, respectively. The first side 12 of the door frame 30 and the second side 14 of the door frame 30 are spaced apart by a thickness of the door frame 30. The door 50 may secure to the door frame 30 on the first side 12 or the second side 14 of the door frame 30. The door 50 may be a hinged door or a pivot door.

The door frame 30 includes a header 34, a pair of jambs 36, and a sill 38. The header 34, the jambs 36, and the sill 38 define the doorway 32. In some embodiments, the door frame 30 includes a stop 40. In embodiments where the door frame 30 has a stop 40, the stop 40 engages the door 50 when the door 50 is in the closed position to prevent the door 50 from passing entirely through the doorway 32. In some embodiments, the door frame 30 may be provided without a stop 40, e.g., when the door 50 is a pivot door. A portion of the stop 40 projects from each of the header 34 and the jambs 36 into the doorway 32. The stop 40 has an interior side 42 and an exterior side 44 corresponding to the first side 12 and the second side 14 of the door frame 30. The interior side 42 of the stop 40 and the exterior side 44 of the stop 40 are spaced apart by a thickness of the stop 40. When door 50 is in the closed position an exterior face 54 of the door 50 engages the interior side 42 of the stop 40. In some embodiments, the interior side 42 of the stop 40 includes weather stripping to form a weather resistant seal between the interior side 42 of the stop 40 and the exterior face 54 of the door 50 around the perimeter of the doorway 32.

Figure 3:
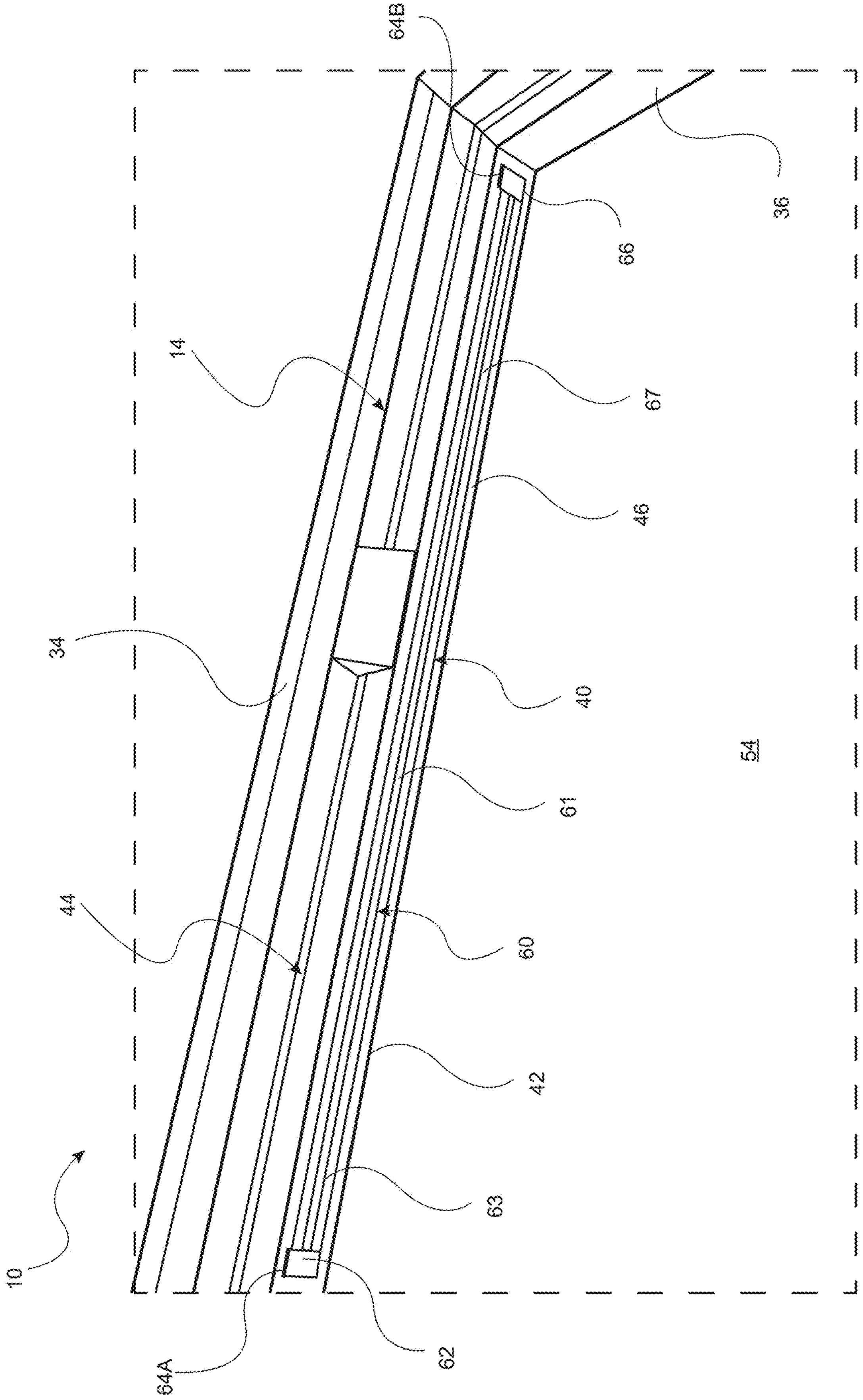
FIG. 3 is an exterior, perspective view of a header of the door frame of FIG. 1.
Figure 4:
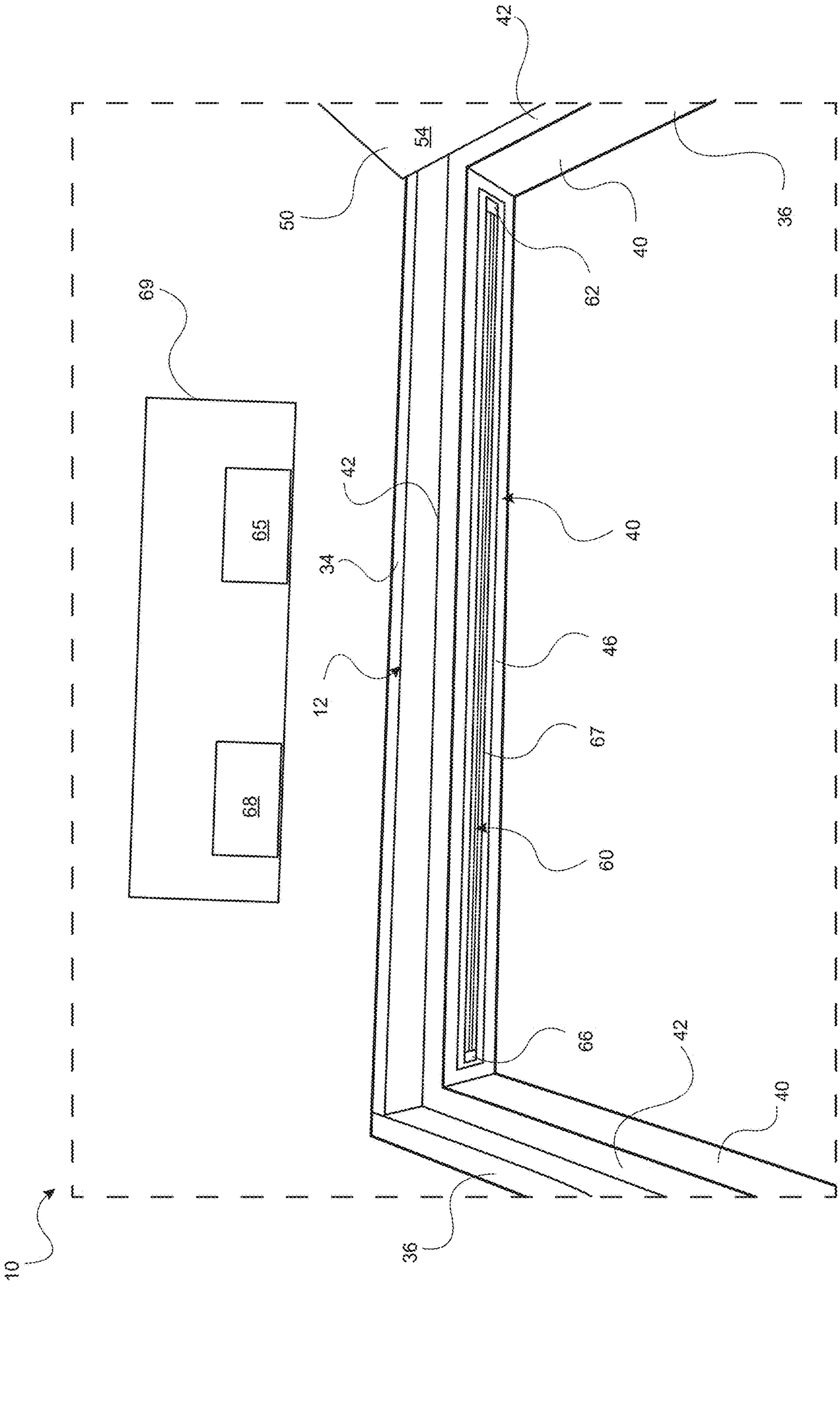
FIG. 4 is an interior, perspective view of a header of the door frame of FIG. 1 with the door in an open position.
Figure 5:
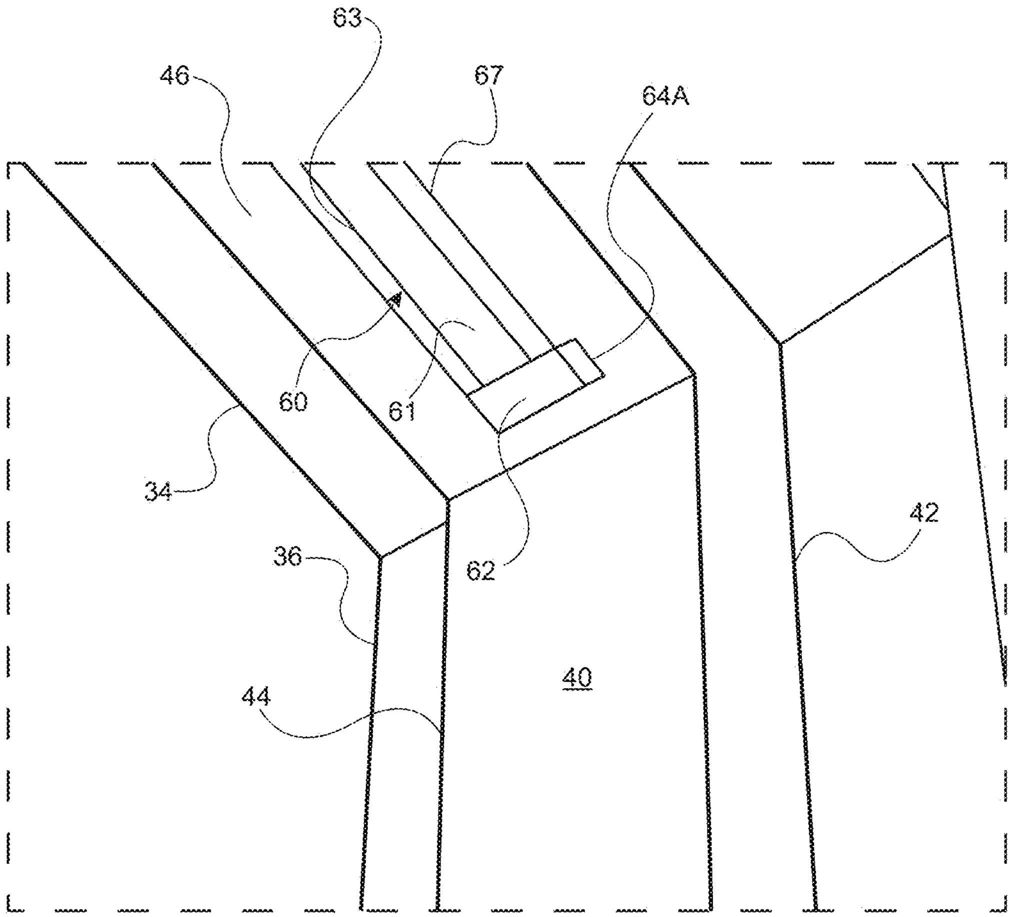
FIG. 5 is a detail view of an end segment of the door frame of FIG. 4 illustrating a light fixture of the door frame.

With additional reference to FIGS. 3-5, the door frame 30 includes a light fixture 60 secured to the header 34 to illuminate the doorway 32. The light fixture 60 may be disposed within the header 34 or may be mounted to a surface of the header 34. The light fixture 60 may be positioned in the header 34 between the first side 12 and the second side 14 of the door frame 30. In embodiments, the light fixture 60 may be positioned in the stop 40 of the header 34 between the interior side 42 and the exterior side 44 of the stop 40. In some embodiments, the light fixture 60 is secured to the header 34 between the second side 14 of the door frame 30 and the exterior side 44 of the stop 40. As shown in FIG. 4, the light fixture 60 may extend substantially the width of the header 34. The light fixture 60 may have an outer surface 67 and may be disposed within the header 34 such that the outer surface 67 is substantially flush with a bottom surface 46 of the header 34, as shown in FIG. 5. In embodiments, the light fixture 60 is positioned within a recess defined within the header 34. In some embodiments, the light fixture 60 is secured to the bottom surface 46 such that the light fixture 60 protrudes from the bottom surface 46 such that the outer surface 67 is not flush with the bottom surface 46. In certain embodiments, a portion of the light fixture 60 is disposed within or mounted to one of the jambs 36. In particular embodiments, the door frame 30 includes more than one light fixture 60. Each light fixture 60 may be disposed in or mounted to the same member of the door frame 30, e.g., three of the light fixtures 60 may be in the header 34 or a jamb 36, or the light fixtures 60 may be disposed in a different member of the door frame 30, e.g., one light fixture 60 disposed within the header 34 and one light fixture 60 disposed within each of the jambs 36.

The light fixture 60 may be provided as part of the door assembly 10 for installation during construction or remodeling of a structure. In the case of existing structures, the light fixture 60 may be secured to the header 34 of an existing door frame 30. In embodiments, a recess is cut into the header 34 of an existing door frame 30 to receive the light fixture 60. The light fixture 60 may have rounded or arcuate end segments 64*a*, 64*b* to eliminate the need for the recess to have sharp internal corners cut into to the ends of the recess. In some embodiments, the light fixture 60 is surface mounted to the header 34. The light fixture 60 may be surface mounted to the header 34 by fasteners, e.g., screws. The light fixture 60 may be sized and dimensioned to fill the space along the header 34 defined between the exterior side 44 of the stop 40 and the second side 14 of the door frame 30 such that the outer surface 67 of the light fixture 60 is flush with the stop 40.

Figure 6:
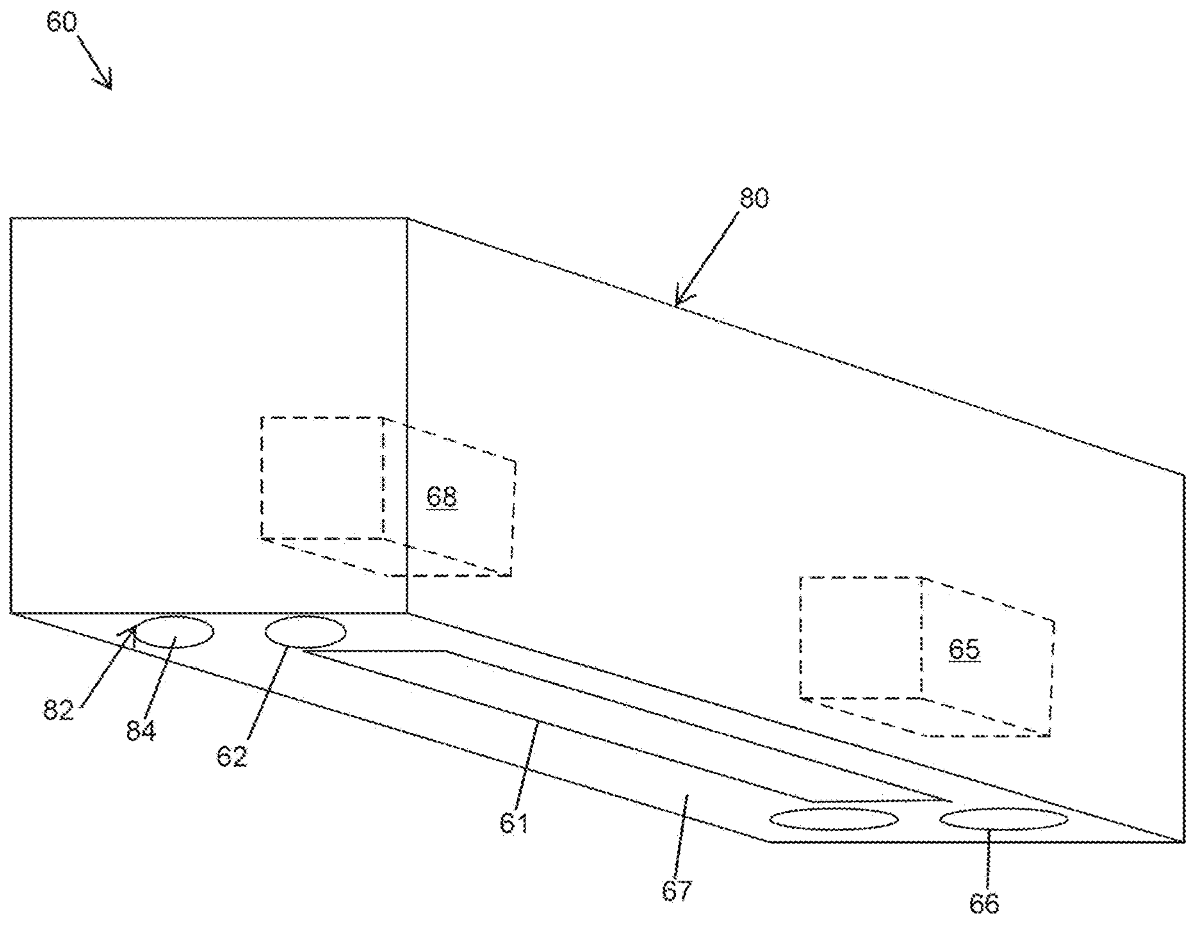
FIG. 6 is a perspective view of a light fixture in accordance with embodiments of the present disclosure.

With additional reference to FIG. 6, the light fixture 60 may be a self-contained unit with the light fixture 60 including all elements necessary for operation of the light fixture 60 within itself. The light fixture 60 includes a light element 61 and a first sensor 62. The light element 61 and the first sensor 62 are disposed within the light fixture 60. The first sensor 62 switches the light fixture 60 between an on-state and an off-state in response to changes in environmental conditions. In the on-state, the light element 61 emits light such that the light fixture 60 illuminates the doorway 32. In the off-state, the light element 61 does not emit light. The light element 61 may be any type of lighting element that is configured to emit light in response to energy passing through the lighting element including, but not limited to, one or more light emitting diodes (LED), fluorescent, halogen, or incandescent. In embodiments, the intensity, color, or temperature of the light emitted by the light element 61 may be controlled. In some embodiments, the light fixture 60 includes a removable shroud 63. The removable shroud may be disposed on the outer surface 67 of light fixture 60 and may extend between the first sensor 62 and the and the second sensor 66. The removable shroud 63 may allow access to the elements disposed within the light fixture 60 to facilitate serviceability the light fixture 60 while the light fixture 60 is disposed within the header 34, e.g., to allow for replacement of the light element 61. The removable shroud 63 may attach to the light fixture 60 such that the removable shroud 63 forms a portion of the outer surface 67 of the light fixture 60. The removable shroud 63 may be transparent or translucent to disperse light emitted by the light element 61. The removeable shroud 63 may conceal fasteners securing the light fixture 60 to the header 34 from within the light fixture 60, e.g., by screws disposed through a wall of the light fixture 60 opposing the outer surface 67.

The first sensor 62 is disposed within the light fixture 60. In some embodiments, the first sensor 62 is disposed in a first end segment 64*a* of the light fixture 60. In some embodiments, the light fixture 60 includes a second sensor 66 disposed within a second end segment 64*b* of the light fixture 60 that is opposite the first end segment 64*a*. The first end segment 64*a* and the second end segment 64*b* may be separated by the light element 61. The first sensor 62 and the second sensor 66 may be concealed within the light fixture 60. In particular embodiments, the first sensor 62 or the second sensor 66 may project from the outer surface 67 in a respective end segment 64*a*, 64*b*. The first sensor 62 or the second sensor 66 projecting from the outer surface 67 may increase the sensory field of the first sensor 62 or the second sensor 66. Additionally or alternatively, the sensors 62, 66 may be angled relative to the door frame 30 such that a sensory field of the sensors 62, 66 is directed outwardly away from the door assembly 10. The first sensor 62 or the second sensor 66 may be, but are not limited to, a motion sensor, a light level sensor, an IR receiver, an RF receiver, a light curtain sensor, an audio receiver, a proximity sensor, or a position sensor.

In particular embodiments, the light fixture 60 includes a controller 65 in signal communication with the sensors 62, 66. The controller 65 may be disposed within the light fixture 60 (FIG. 6). In some embodiments, the controller 65 may be positioned outside of the light fixture 60 and disposed within the header 34, above the header 34 (FIG. 4), or within the door 50 while receiving signals from and sending signals to the sensors 62, 66 to control the light element 61. The controller 65 may receive signals from a user to control the light fixture 60. For example, a user may send a signal to the controller 65 via Wi-Fi or Bluetooth® to switch the light element 61 between the on-state and the off-state, or to change the operation parameters of the sensors 62, 64.

The light fixture 60 is electrically coupled to a power source. The power source may be a battery 68. The battery 68 may be disposed within the light fixture 60, the header 34 or the door 50. In certain embodiments, the power source is the electrical system of the structure having the door frame 30 with the light fixture 60 hardwired to the electrical system. In some embodiments, the light fixture 60 is electrically coupled to the electrical system of the structure having the door frame 30 and to the battery 68 that acts as a reserve power supply.

Continuing to refer to FIGS. 3-6, the light fixture 60 may include a case 80 to contain the components of the light fixture 60. The case 80 may be modular to allow for expansion of functionality or serviceability of the light fixture 60. The case 80 may enclose the light element 61, the first sensor 62, the second sensor 66, the battery 68, the controller 65, and/or a plurality of additional accessories. Accessories may be added or removed as necessary to configure the light fixture 60 as desired. For example, the additional accessories may include a camera, a microphone, speakers, heat sensors, or the like. The accessories may replace the first sensor 62 and the second sensor 66 or may be in addition to the sensors 62, 66. The case 80 may define a plurality of ports 82 to selectively receive the sensors 62, 66 or other accessories. The case 80 may define two, three, four, or more than four ports 82. The light fixture 60 may include removable plugs 84 to fill the ports 82 in lieu of an accessory. The plugs 84 may seal the case 80 to protect the electronics stored in the case 80 from moisture and debris.

With particular reference to FIG. 4, in embodiments where the battery 68 is disposed outside the light fixture 60, the door assembly 10 may include an access box 69 mounted within the wall of a structure near the door frame 30. For example, the access box 69 may be positioned above the header 34 as shown. The access box 69 may provide access to the battery 68 and other components, e.g., the controller 65, for maintenance or installation of other accessories. The sensors 62, 66 may be accessed and replaced from within the access box 69. The access box 69 may facilitate serviceability of the light fixture 60.

Continuing to refer to FIGS. 3-6, the functions of the sensors 62, 66 are described in accordance with embodiments of the present disclosure. In embodiments, the first sensor 62 is a motion sensor or proximity sensor and the second sensor 66 is a light level sensor such that the light fixture 60 may switch to the on-state in response to a user approaching the second side 14 of the door frame 30 or when ambient light drops below a threshold on-level. The threshold on-level may be the ambient light level at sunset, e.g., approximately 300-500 lux. In some embodiments, the first sensor 62 is a motion sensor or proximity sensor and the second sensor 66 is a light level sensor such that the light fixture 60 switches to the on-state in response to a user approaching the second side 14 of the door frame 30 only when ambient light drops below a threshold on-level. The light fixture 60 may switch to the off-state after a predetermined duration without motion sensed by the first sensor 62 or after a specified duration after the second sensor 66 senses ambient light levels below the threshold on-level. The light fixture 60 may switch to the off-state in response to the second sensor 66 sensing ambient light above a threshold off-level. The threshold off-level may be the ambient light level at sunrise, e.g., approximately 300-500 lux. The predetermined duration without motion sensed by the first sensor 62 may be in the range of a few seconds to several minutes, e.g., 5-seconds, 30-second, I-minute, 5-minutes, or more than 5-minutes. The specified duration after the second sensor 66 senses ambient light levels below a threshold on-level may be in the range of a few seconds to several hours, e.g., 30-seconds to 12-hours, or the specified duration may end at a specified time of day, e.g., midnight. In certain embodiments, the light fixture 60 may be controlled remotely from a computer or a cell phone through Wi-Fi, Bluetooth®, or telecommunications modules (e.g., 3G, 4G, 5G) to switch the light fixture 60 between the off-state and the on-state or to set the predetermined and specified durations for a respective sensor 62, 66.

Additionally or alternatively, switching of the light fixture 60 to the on-state in response to motion sensed by the first sensor 62 may be limited to when the second sensor 66 contemporaneously senses ambient light levels below a threshold on-level. Controlling the light fixture 60 by input from both the first sensor 62 and the second sensor 66 may conserve power usage and/or extend the life of the battery 68 by preventing the light fixture 60 from switching to the on-state during daylight hours. As noted above, the first sensor 62 or the second sensor 66 may project from a respective end segment **64*a*, 64*b*. In this example, projection of the first sensor 62 from the first end segment 64*a* may increase the sensory field of the first sensor 62, allowing for detection of motion a greater distance from the second side 14 of the door frame 30**.

In some embodiments, the light fixture 60 switches to the on-state in response to the position of the door 50. When the door 50 is moved to the open position the light fixture 60 may switch to the on-state. In such embodiments, the light fixture 60 may switch to the on-state independently of input from the first sensor 62 or the second sensor 66. In particular embodiments, the light fixture 60 switches to the on-state in response to operation of a lock 56 of the door 50. Transitioning the lock 56 to an unlocked configuration may switch the light fixture 60 to the on-state. In some embodiments, the light fixture 60 is manually operable by a wall switch on the first side 12 of the door frame 30. In certain embodiments, the light fixture 60 may supplement or replace exterior lighting.

In embodiments, the light fixture 60 may include a microphone, speakers, and a camera in communication with one another to act as an intercom system allowing for communication of users across the door assembly 10 or monitoring of activity near the door assembly 10. The microphone may detect and operate the light fixture 60 in response to specific sounds. In embodiments, a user speaking a phrase such as "light on" or "light off" may be detected by the microphone and may switch the light element 61 between the on-state and the off-state. Such embodiments may allow for control of the light fixture 60 before a sensor 62, 66 detects motion of an approaching user.

In some embodiments, the light fixture 60 includes a thermal sensor that may detect an approaching user to control the light element 61. The thermal sensor may be configured to control the light element 61 in response to detection of a particular thermal signature to reduce unnecessary activation of the light element 61. The thermal signature may be based on the size of the thermal signature or the temperature of the thermal signature, e.g., human sized or human body temperature.

Figure 7:
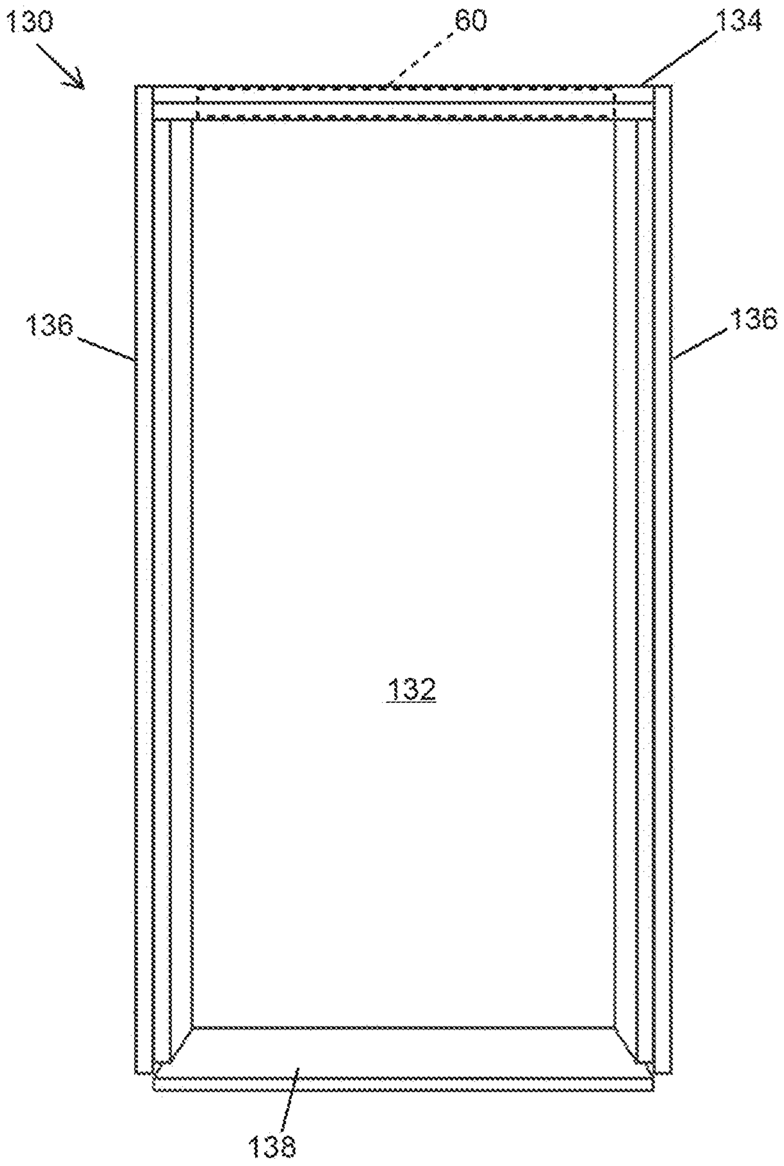
FIG. 7 is a front view of an interior door frame in accordance with embodiments of the present disclosure.

With reference to FIG. 7, in some embodiments the light fixture 60 is installed in the frame of an interior door frame 130 to illuminate the doorway 132. The interior door frame 130 includes a header 134 and jambs 136. The light fixture 60 may be disposed in the header 134. The interior door frame 130 may include a door or may be a framed opening without a door as shown. The sensors 62, 66 of the light fixture 60 may detect motion on a singular side of the interior door frame 130 or both sides of the interior door frame 130. In certain embodiments, several light fixtures 60 may be in signal communication with each other such that as a user move through a structure, from one room to another room, the several light fixtures 60 switch between the on-state and the off-state to illuminate the path of the user through the structure. The light fixture 60 may be oriented to illuminate a single side of the interior door frame 130 or both sides of the interior door frame 130. For example, the interior door frame 130 may be the door frame of a closet and the light fixture may be oriented to illuminate the interior of the closet.

Figure 8:
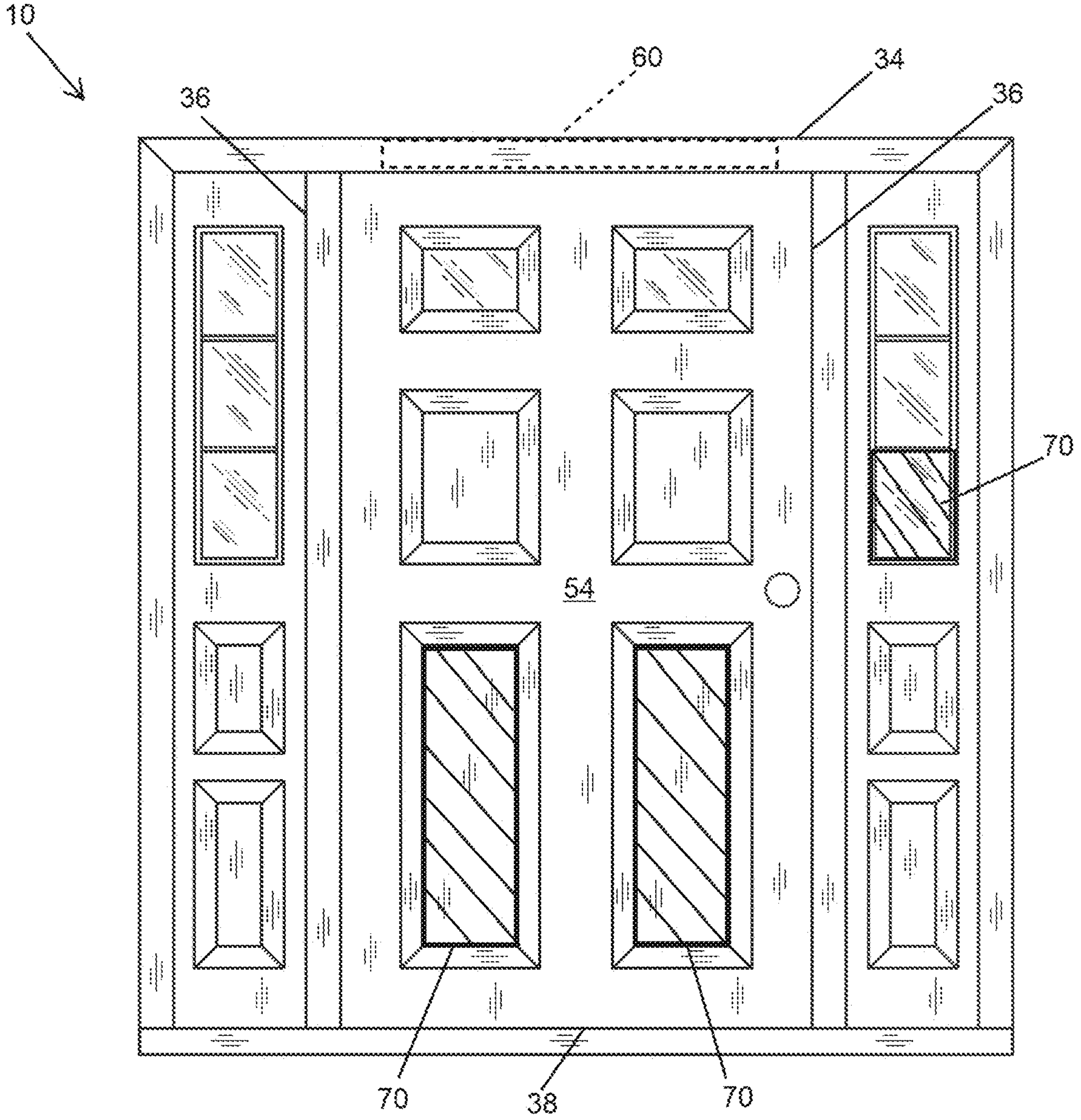
FIG. 8 is a front view of a door frame assembly in accordance with embodiments of the present disclosure.

Referring to FIG. 8, the door assembly 10 may include solar panels 70 that are in electrical communication with the light fixture 60. The solar panels 70 may be electrically coupled to the battery 68 to charge the battery 68 of the light fixture 60 or may be electrically coupled to the light element 61 to deliver electrical energy directly. The solar panels 70 may be integrated into the door 50 or may part of a sidelight or window of the door assembly 10. In some embodiments, the solar panels 70 may be disposed on a wall or placed adjacent the door assembly 10. Inclusion of solar panels 70 may be particularly desirable where the door assembly 10 receives direct sunlight for several hours per day, e.g., where the door assembly 10 is south-facing in the northern hemisphere.

Referring back to FIGS. 1 and 2, in particular embodiments, the door frame 30 may be a powered door assembly including an energy transfer device and electrical components. The energy transfer device may transfer electrical energy and/or signals between the door frame 30 and the door 50. The energy transfer device may transmit energy through a wired or a wireless connection. For example, the energy transfer device may include a cable that extends from the door frame 30 of the door 50 to transfer energy and/or signals therebetween. In some embodiments, the energy transfer device may include inductive coils and receivers in the door frame 30 and/or the door 50 to wirelessly transfer energy and/or signals therebetween.

The electrical components may aid in operation and expand the functionality of the door frame 30. The electrical components may be disposed within the door frame 30 or the door 50. Electrical components may include, but are not limited to, batteries, powered locks (e.g., push button, biometric reader, RFID reader), intercoms, cameras, lights, Wi-Fi modules, Bluetooth® modules, telecommunications modules (e.g., 3G, 4G, 5G), sensors (e.g., motion sensors, proximity sensors, contact sensors, pressure sensors), or digital displays. One or more of the electrical components may interface with devices remote from the door frame 30 including, but not limited to, a smartphone, a computer, or a smart home system or device.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A door assembly comprising:
a door frame defining a doorway, the door frame comprising:
a first jamb;
a second jamb opposing the first jamb;
a header having a bottom surface and extending between the first jamb and the second jamb;
a door having an interior face and an exterior face opposite the interior face, the door pivotally secured to the door frame, the door having a closed position in which the door fills the doorway and an open position in which passage through the door frame is allowed; and
a light fixture disposed within the header on an exterior side of the door, such that an outer surface of the light fixture is substantially flush with the bottom surface of the header, the light fixture being switchable, in response to input from a sensor disposed within the light fixture, between an on-state in which the light fixture illuminates the doorway and an off-state.

2. The door assembly according to claim 1, wherein the sensor is disposed within the light fixture at a first end segment thereof.

3. The door assembly according to claim 2, wherein another sensor is disposed within the light fixture at a second end segment opposite the first end segment of the light fixture.

4. The door assembly according to claim 3, wherein the light fixture comprises a light element, and the first end segment and the second end segment are separated by the light element.

5. The door assembly according to claim 1, wherein the sensor is a motion sensor configured to switch the light fixture from the off-state to the on-state in response to motion on the exterior side of the door.

6. The door assembly according to claim 1, wherein the sensor is a light level sensor configured to switch the light fixture from the off-state to the on-state in response to ambient light levels being below a threshold level and to switch the light fixture from the on-state to the off-state in response to ambient light levels being above a threshold level.

7. The door assembly according claim 1, wherein the light fixture spans substantially the entire width of the header.

8. The door assembly according claim 1, wherein the header comprises a battery in electrical communication with the light fixture.

9. A door frame assembly having an interior side and an exterior side, the door frame assembly comprising:
a first jamb;
a second jamb;
a header having a bottom surface extending between the first jamb and the second jamb; and
a light fixture disposed within the header between the interior side and the exterior side of the door frame assembly, such that an outer surface of the light fixture is substantially flush with the bottom surface of the header, the light fixture configured to switch between an on-state and an off-state in response to environmental conditions.

10. The door frame assembly according to claim 9, wherein the light fixture configured to switch from the off-state to the on-state in response to motion on the exterior side of the door frame assembly.

11. The door frame assembly according to claim 10, wherein the light fixture is configured to switch from the off-state to the on-state in response to ambient light levels below a threshold level and to switch from the on-state to the off-state in response to ambient light levels above a threshold level.

12. A light fixture for a door frame, the light fixture comprising:
a case defining a plurality of ports, the case configured to be disposed within a bottom surface of a header of a door frame such that an outer surface of the light fixture is substantially flush with the bottom surface, the bottom surface extending between a first jamb of the door frame and a second jamb of the door frame;
a light element disposed within the case, the light element having an on-state in which the light element is configured to illuminate a doorway defined by the door frame and an off-state;
a first sensor disposed through one port of the plurality of ports; and
a second sensor disposed through another port of the plurality of ports, the first sensor or the second sensor in signal communication with the light element to switch the light element between the on-state and the off-state in response to environmental conditions.

13. A door assembly comprising:
a door frame defining a doorway, the door frame comprising:
a first jamb;
a second jamb opposing the first jamb; and
a header having a bottom surface extending between the first jamb and the second jamb; and
a light fixture disposed within the bottom surface of the header such that an outer surface of the light fixture is substantially flush with the bottom surface, the light fixture comprising:
a light element having an on-state in which the light element is configured to illuminate the doorway and an off-state;
a first sensor; and
a second sensor, the first sensor or the second sensor in signal communication with the light element to switch the light element between the on-state and the off-state in response to environmental conditions, the light fixture configured such that the light element, the first sensor, or the second sensor are serviceable while the light fixture is within the header.

14. The door assembly of claim 1, wherein light emitted from the light fixture is directed substantially downward away from the bottom surface of the header and into the doorway.

15. The door frame assembly of claim 9, wherein light emitted from the light fixture is directed substantially downward away from the bottom surface of the header and onto the first jamb and second jamb.

16. The door frame assembly according claim 15, wherein the door frame assembly further comprises a battery disposed in the header, the battery in electrical communication with the light fixture.

17. The light fixture for a door frame of claim 12, wherein light emitted from the light element is directed substantially downward away from the bottom surface of the header and into the doorway.

18. The light fixture for a door frame of claim 17, wherein the case is modular to allow for expansion of the light fixture.

19. The light fixture for a door frame of claim 18, further comprising a battery disposed within the case, the batter in electrical communication with the light element.

20. The door assembly of claim 13, wherein light emitted from the light fixture is directed substantially downward away from the bottom surface of the header and into the doorway.

21. The door assembly according claim 20, wherein the door frame further comprises a battery disposed in the header, the battery in electrical communication with the light fixture.

* * * * *